United States Patent
Balasubramanian et al.

(10) Patent No.: US 12,284,317 B2
(45) Date of Patent: Apr. 22, 2025

(54) SYSTEM AND METHOD FOR GENERATING AN EXPANDABLE POOL OF VIRTUAL AGENTS TO PROVIDE SOLUTIONS IN A METAVERSE

(71) Applicant: Bank of America Corporation, Charlotte, NC (US)

(72) Inventors: Prabhakaran Balasubramanian, Vellore (IN); Amit Mishra, Chennai (IN); Anantharajan Srinivasarangan, Chennai (IN); Subburathinam Krishnan, Chennai (IN); Siva Kumar Peesapati Venkata, Hyderabad (IN); Vamshi Krishna Jutur, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 165 days.

(21) Appl. No.: 18/309,879

(22) Filed: May 1, 2023

(65) Prior Publication Data

US 2024/0372947 A1 Nov. 7, 2024

(51) Int. Cl.
*H04M 3/51* (2006.01)
*H04M 3/523* (2006.01)

(52) U.S. Cl.
CPC ....... *H04M 3/5191* (2013.01); *H04M 3/5175* (2013.01); *H04M 3/5233* (2013.01); *H04M 2203/1025* (2013.01); *H04M 2203/403* (2013.01); *H04M 2203/6009* (2013.01)

(58) Field of Classification Search
None
See application file for complete search history.

(56) References Cited

U.S. PATENT DOCUMENTS

| | | |
|---|---|---|
| 9,329,583 B2 | 5/2016 | Slemmer et al. |
| 9,559,993 B2 | 1/2017 | Palakovich et al. |
| 10,218,651 B2 | 2/2019 | Schubert et al. |
| 10,311,377 B2 | 6/2019 | Vijayaraghavan et al. |
| 10,445,351 B2 | 10/2019 | Buryak et al. |
| 10,554,817 B1 | 2/2020 | Sullivan et al. |
| 10,671,806 B2 | 6/2020 | Tsabba |
| 11,388,208 B2 | 7/2022 | Phillips et al. |
| 2006/0215831 A1* | 9/2006 | Knott ............ H04M 3/493 379/88.01 |
| 2009/0193471 A1 | 7/2009 | Rodriguez |

(Continued)

*Primary Examiner* — Harry S Hong

(57) ABSTRACT

A system for generating an expandable pool of virtual agents to provide solutions in a virtual environment comprises a call center server in communication with a metaverse server. The call center server generates the virtual agents with corresponding skills of each real-world agent using a machine learning model based on historical observation operations performed by each particular real-world agent and a historical rule set to address the service issue. The metaverse server identifies the virtual agents in the virtual environment. The call center server routes a service inquiry with a service issue from a user equipment of a user to the metaverse server when determining that a particular real-world agent is not available. The metaverse server identifies a first virtual agent with a first skill and conducts a first interaction between the first virtual agent and a user avatar to generate the customized solution to address the service issue.

20 Claims, 5 Drawing Sheets

(56) References Cited

U.S. PATENT DOCUMENTS

| | | |
|---|---|---|
| 2010/0226490 A1* | 9/2010 | Schultz ............... H04M 3/5233 |
| | | 379/265.09 |
| 2014/0343951 A1 | 11/2014 | Rodriguez et al. |
| 2016/0099892 A1 | 4/2016 | Palakovich et al. |
| 2018/0053119 A1 | 2/2018 | Zeng et al. |
| 2019/0130312 A1 | 5/2019 | Xiong et al. |
| 2020/0005117 A1 | 1/2020 | Ning et al. |
| 2020/0076947 A1* | 3/2020 | Deole .................. H04M 3/527 |
| 2020/0177589 A1 | 6/2020 | Mangalvedkar et al. |
| 2020/0220789 A1 | 7/2020 | Olsson et al. |
| 2021/0136205 A1* | 5/2021 | Adibi ..................... G06N 20/00 |
| 2021/0304277 A1 | 9/2021 | Nomula et al. |
| 2022/0035903 A1 | 2/2022 | Kim |
| 2023/0089757 A1* | 3/2023 | Sait M A ............ H04M 3/5166 |

* cited by examiner

SYSTEM AND METHOD FOR GENERATING AN EXPANDABLE POOL OF VIRTUAL AGENTS TO PROVIDE SOLUTIONS IN A METAVERSE

TECHNICAL FIELD

The present disclosure relates generally to network communications and information security, and more specifically to a system and method for generating an expandable pool of virtual agents to provide solutions in a metaverse.

BACKGROUND

When a user requests services from a call center, the user may normally be required to have a voice authentication, wait on hold for a long time, explain an inquiry, and perform a physical sign registration, etc. The user may experience a delay in getting services in a time-consuming operation process due to waiting for an available agent, and preforming user identify verification on service requirements, among others. Current technology does not provide an efficient and effective solution to process user inquiries to provide solutions in the call center.

SUMMARY

Conventional technology is not configured to provide an efficient solution to process user inquiries and provide customized solutions in a call center when real-world agents are not available to respond to service inquires. The disclosed system described in the present disclosure is particularly integrated into a practical application of generating an expandable pool of virtual agents to provide customized solutions in a metaverse (e.g., a virtual environment).

In a conventional system, a user usually contacts a call center to interact with a real-world agent for a service issue. When the real-world agent is not available, the user may need to wait on hold for a long time and experience a delay in getting services. The present system addresses this issue by generating an expandable pool of virtual agents associated with a plurality of skills of a real-world agent. In some embodiments, a call center server trains the virtual agents associated with particular skills based on observation of operations by the real-world agent during a plurality of interaction sessions and a plurality of rule sets applied by the real-world agent through an agent equipment. The call center server communicates data of the expandable pool of the virtual agents to a metaverse server. When a call center server identifies the real-world agent is not available to respond to a service inquiry associated with a service issue, the call center server may route the service inquiry to a metaverse server. The metaverse server identifies a virtual agent from the expandable pool of the virtual agents. The virtual agent is associated with a particular skill based on the service issue associated with the service inquiry. Further, the metaverse server conducts an interaction between the virtual agent and a user avatar to generate a customized solution to address the service issue in the virtual environment.

In one embodiment, the system for generating an expandable pool of virtual agents to provide solutions in a virtual environment comprises a call center server in communication with a metaverse server via a network. The call center server and the metaverse server are in communication with a central database. The central database stores historical interaction data associated with a plurality of real-world agents. The historical interaction data comprises a plurality of historical observation operations and historical rule sets applied by corresponding real-world agents to address historical service issues. The call center server receives at least a portion of the plurality of historical observation operations performed by a particular real-world agent through an agent equipment during a plurality of interaction sessions in response to a plurality of service issues. The call center server identifies at least a portion of the plurality of historical rule sets applied by the particular real-world agent through the agent equipment. The plurality of the historical rule sets are configured to provide corresponding solutions in response to the plurality of the service issues.

The call center server generates an expandable pool of virtual agents associated with a plurality of skills of the particular real-world agent. Each virtual agent of the expandable pool of virtual agents is trained to have one or more unique skills of solving a corresponding service issue using a machine learning model based on the historical observation operations performed by the particular real-world agent and a historical rule set to address the service issue. The call center server communicates data of the expandable pool of the virtual agents to the metaverse server. The metaverse server identifies the expandable pool of the virtual agents in a virtual environment based on the data of the expandable pool of the virtual agents. The call center server receives a service inquiry with a service issue from a user equipment associated with a user. The call center server determines whether the particular real-world agent is available to respond to the service inquiry through the agent equipment. In response to determining that the particular real-world agent is not available to respond to the service inquiry through the agent equipment, the call center server routes the service inquiry with the service issue to the metaverse server. The metaverse server identifies a first virtual agent from the expandable pool of the virtual agents. The first virtual agent is associated with a first skill based on the service issue associated with the service inquiry from the user equipment. The metaverse server conducts a first interaction between the first virtual agent and the user avatar associated with the user equipment of the user.

The system described in the present disclosure provides practical applications with technical solutions to generate an expandable pool of virtual agents to implement virtualized interactions between virtual agents with different skills and user avatars to provide frictionless call services to address corresponding service issues of user inquires in a seamless manner. The disclosed system provides the practical application to deploy the expandable pool of the virtual agents in the virtual environment to provide customized solutions to address various service issues for users. For example, the call center server routes a service inquiry with a service issue to the metaverse server when identifying a real-world agent is not available to respond to the service inquiry. The metaverse server identifies a particular virtual agent with a particular skill from the expandable pool of the virtual agents based on the service issue. The particular virtual agent may interact with a user avatar to provide a customized solution to the service issue in the virtual environment. In this way, the practical application provides efficient and effective solutions by implementing virtual interactions between virtual agents with different skills and user avatars to provide frictionless call services to address service issues in the virtual environment when real-world agents are unavailable to interact with users. In one embodiment, the disclosed system may create and present a virtual hold room to provide a user through a user avatar with customized bi-directional interactive experience associated with various entity products and services in the virtual environment. In one embodiment, the disclosed system integrates an Internet of Things (IoT) enabled call center and the user avatar to facilitate automatic inquiry processing, form submission, and other activities on behalf of a user without an actual user physical involvement in the virtual environment. The practical application may reduce declined requests and save interaction processing time to address the service issues. The disclosed system further increases user interactions associated with various entity services.

The practical application, in turn, improves the performance and underlying operation of the disclosed system and reduces the consumption of networking resources and data transmissions in the network. The practical application reduces usage of network bandwidth necessitated by providing faster services with customized solutions in response to user inquiries to a call center. The disclosed system provides a frictionless interaction session with more efficient interactions.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description. Like reference numerals represent like parts.

DETAILED DESCRIPTION

Previous technologies fail to provide efficient and reliable solutions to process user inquiries and provide solutions in a call center when real-world agents are not available to respond to service inquires. This disclosure presents a system for generating an expandable pool of virtual agents to provide solutions in a virtual environment by referring to FIGS. 1 through 3A-3C.

System Overview

Figure 1:
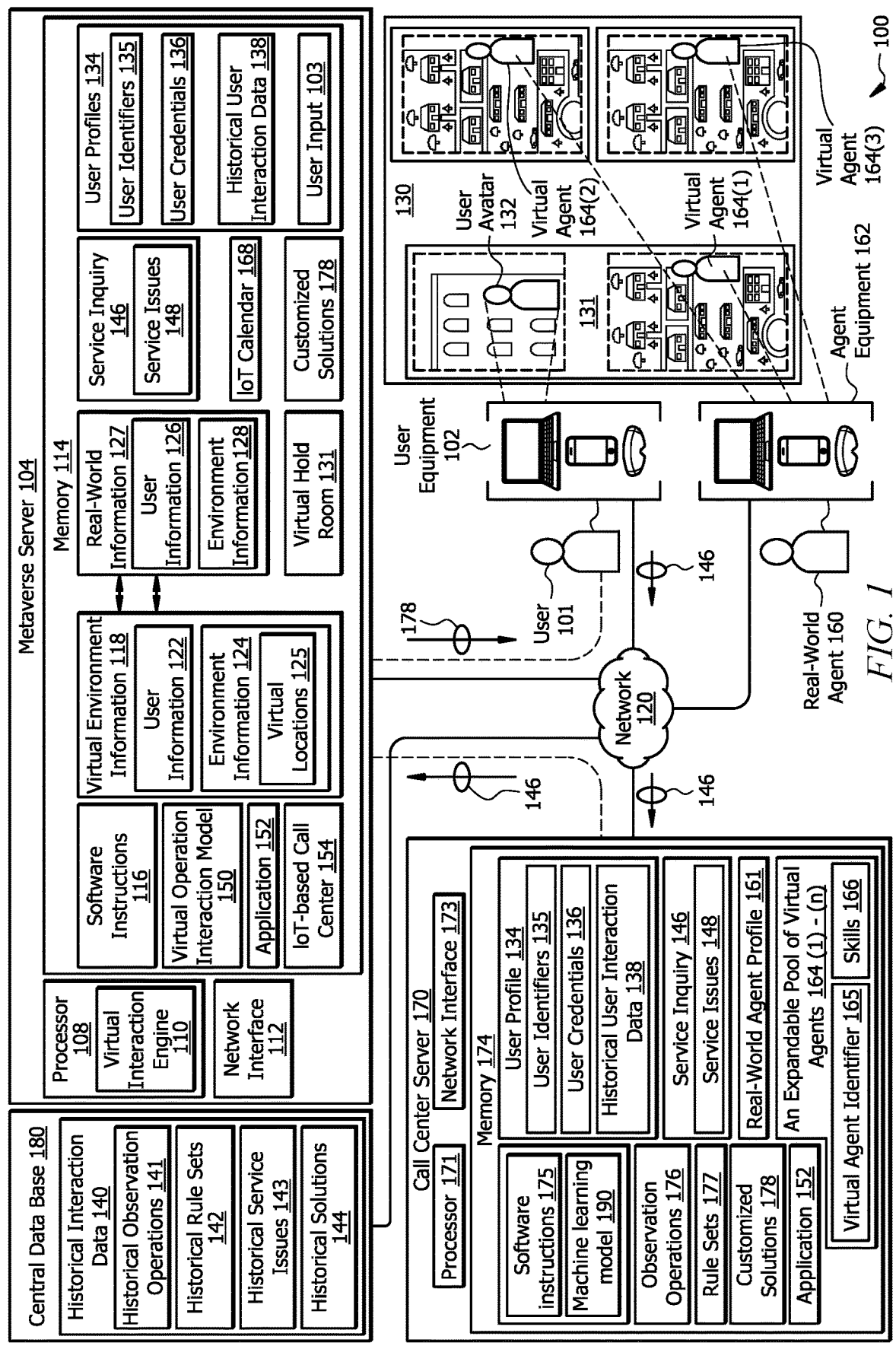
FIG. 1 illustrates an embodiment of a system configured to generate an expandable pool of virtual agents in a virtual environment.

FIG. 1 illustrates one embodiment of a system 100 that is configured to generate an expandable pool of virtual agents to address issues in the virtual environment 130. In a particular embodiment, the virtual agents provide solutions to a variety of issues being faced by users. System 100 comprises a metaverse server 104, a call center server 170, a central database 180, one or more user equipment 102, one or more agent equipment 162 and a network 120. The network 120 enables the communication between components of the system 100. Call center server 170 comprises a processor 171 in signal communication with a memory 174. Memory 174 stores software instructions 175 that when executed by the processor 171, cause the processor 171 to perform operations illustrated in FIGS. 1 and 3A-3C. The call center server 170 and the metaverse server 104 are in communication with the central database 180. Metaverse server 104 comprises a processor 108 in signal communication with a memory 114. Memory 114 stores software instructions 116 that when executed by the metaverse server 104, cause the metaverse server 104 to execute a virtual interaction engine 110 to perform operations illustrated in FIGS. 1 and 3A-3C.

In some embodiments, a first user 101 may use a first communication equipment 102 to communicate with a call center server 170 and send a service inquiry 146 with a service issue 148 associated with one or more products or services provided by an entity. The call center server 170 may use a machine learning model 190 to generate an expandable pool of virtual agents 164[1]-[n] associated with a plurality of skills 166 of corresponding real-world agents 160 based on historical interaction data 140 stored in the central database 180. When the call center server 170 identifies that there is no real-world agent 160 available to respond to the service inquiry 146, the call center server 170 may route the service inquiry 146 to a metaverse server 104. The metaverse server 104 may identify a virtual agent 164 associated with a particular skill 166 from the expandable pool of the virtual agents 164[1]-[n]. Further, the metaverse server 104 conducts an interaction between the virtual agent 164[1] and a user avatar 132 associated with the user equipment 102 to generate a customized solution 178 to address the service issue 148.

System Components

Network

The network 120 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 120 may be configured to support any suitable type of communication protocol as would be appreciated by one of ordinary skill in the art.

User Equipment

User equipment 102 is hardware computing equipment that is generally configured to provide hardware and software resources to a user 101. Examples of a user equipment 102 include, but are not limited to, a virtual reality (VR) device, an augmented reality (AR) device, a laptop, a computer, a smartphone, a tablet, a smart device, an Internet-of-Things (IoT) device, or any other suitable type of device. The user equipment 102 may comprise a graphical user interface (e.g., a display 206), a touchscreen, a touchpad, keys, buttons, a mouse, or any other suitable type of hardware that allows a user 101 to view data and/or to provide inputs into the user equipment 102.

Each user equipment 102 is configured to display a two-dimensional (2D) or three-dimensional (3D) representation of a virtual environment 130 to a user 101. Within the virtual environment 130, each user 101 may be associated with a user equipment 102 and a user avatar 132. A user avatar 132 is a graphical representation of the user equipment 102 associated with the user 101 and the user profile 134 within the virtual environment 130. Examples of the user avatars 132 include, but are not limited to, a person, an animal, or an object. In some embodiments, the features and characteristics of the user avatar 132 may be customizable and user defined. By using the user avatar 132, a user 101 or the user equipment 102 can move within the virtual environment 130 to interact with an entity associated with the metaverse server 104 or other avatars and objects within the virtual environment 130.

Figure 2:
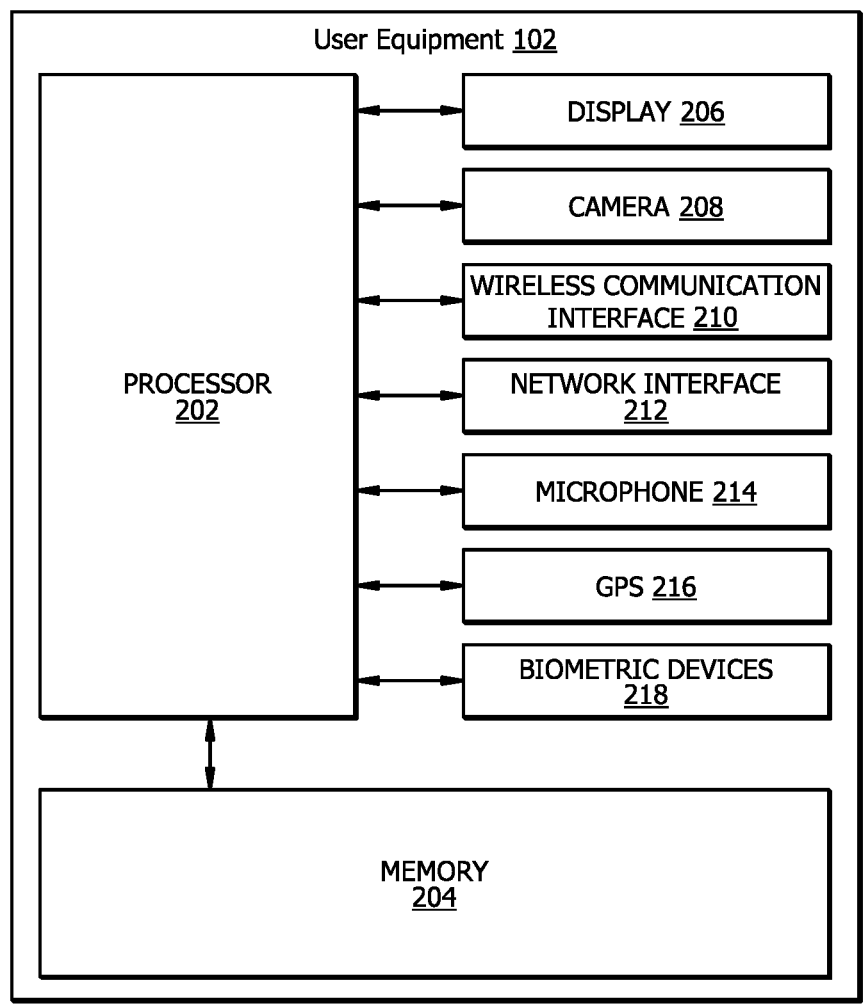
FIG. 2 is a block diagram of an example user equipment of the system of FIG. 1.

FIG. 2 is a block diagram of an embodiment of the user equipment 102 used by the system 100 of FIG. 1. The user equipment 102 may be configured to display the virtual environment 130 (referring to FIG. 1) within a field of view of the user 101 (referring to FIG. 1), capture biometric, sensory, and/or physical information of the user wearing and operating the user equipment 102, and to facilitate an electronic interaction between the user and the metaverse server 104. The user equipment 102 comprises a processor 202, a memory 204, and a display 206. The processor 202 comprises one or more processors operably coupled to and in signal communication with memory 204, display 206, camera 208, wireless communication interface 210, network interface 212, microphone 214, GPS sensor 216, and biometric devices 218. The one or more processors is any electronic circuitry including, but not limited to, state machines, one or more central processing unit (CPU) chips, logic units, cores (e.g., a multi-core processor), field-programmable gate array (FPGAS), application specific integrated circuits (ASICS), or digital signal processors (DSPS). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1 and 3A-3C. For example, processor 202 may be configured to display virtual objects on display 206, detect user location, identify virtual sub, capture biometric information of a user 101, via one or more camera 208, microphone 214, and/or biometric devices 218, and communicate via wireless communication interface 210 with a metaverse server 104, a call center server 170, and/or other user equipment 102.

Memory 204 is operable to store any of the information described with respect to FIGS. 1 and 3A-3C along with any other data, instructions, logic, rules, or code operable to implement the function(s) described herein when executed by processor 202. The memory 204 comprises one or more disks, tape drives, or solid-state drives, and may be used as an over-flow data storage device, to store programs when such programs are selected for execution, and to store instructions and data that are read during program execution. In some embodiments, the memory 204 may store and/or include a browser or web application for a user equipment 102 to interact with the entity, such as, for example, to access application services (e.g., application 152) provided by the metaverse server 104 in the virtual environment 130.

Display 206 is configured to present visual information to a user 101 (for example, user in FIG. 1) in an augmented reality environment that overlays virtual or graphical objects onto tangible objects in a real scene in real-time. In other embodiments, the display 206 is configured to present visual information to the user 101 as the virtual environment 130 (referring to FIG. 1) in real-time. In an embodiment, display 206 is a wearable optical display (e.g., glasses or a headset) configured to reflect projected images and enables a user to see through the display 206. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), or any other suitable type of display as would be appreciated by one of ordinary skill in the art upon viewing this disclosure. In another embodiment, display 206 is a graphical display on a user equipment 102. For example, the graphical display may be the display of a tablet or smart phone configured to display an augmented reality environment with virtual or graphical objects overlaid onto tangible objects in a real scene in real-time environment and/or virtual environment 130.

Camera 208 is configured to capture images of a wearer of the user equipment 102. For example, camera 208 may be configured to receive a command from the user to capture images and form a video stream. Wireless communication interface 210 is configured to facilitate processor 202 in communicating with other devices. Wireless communication interface 210 is configured to employ any suitable communication protocol. Network interface 212 may be configured to use any suitable type of communication protocol and enable wired and/or wireless communications. Microphone 214 is configured to capture audio signals (e.g., voice signals or commands) from a user 101. GPS sensor 216 is configured to capture and to provide geographical location information. For example, GPS sensor 216 is configured to provide a geographic location of a user equipment 102 associated with a user 101. Biometric devices 218 are configured to capture information about a person's physical characteristics and to output a biometric signal based on captured information. Examples of biometric devices 218 may include, but are not limited to, retina scanners and fingerprint scanners.

Metaverse Server

Referring to FIG. 1, the metaverse server 104 is a hardware computing equipment that is generally configured to provide services and software and/or hardware resources to user equipment 102. The metaverse server 104 is generally a server, or any other equipment configured to process data and communicate with a call center server 170 and user equipment 102 via the network 120. The metaverse server 104 is generally configured to oversee the operations of a virtual interaction engine 110, as described further below in conjunction with the operational flows of method 300 described in FIGS. 3A-3C. In some embodiments, the metaverse server 104 may be implemented in the cloud or may be organized in either a centralized or distributed manner.

The processor 108 is a hardware computing equipment that comprises one or more processors operably coupled to the memory 114. The processor 108 is any electronic circuitry including, but not limited to, state machines, one or more central processing unit (CPU) chips, logic units, cores (e.g., a multi-core processor), field-programmable gate array (FPGAS), application-specific integrated circuits (ASICS), or digital signal processors (DSPS). The processor 108 may be a programmable logic device, a microcontroller, a microprocessor, or any suitable combination of the preceding. The processor 108 is communicatively coupled to and in signal communication with the memory 114 and the network interface 112. The one or more processors are configured to process data and may be implemented in hardware or software. For example, the processor 108 may be 8-bit, 16-bit, 32-bit, 64-bit, or of any other suitable architecture. The processor 108 may include an arithmetic logic unit (ALU) for performing arithmetic and logic operations, processor registers that supply operands to the ALU and store the results of ALU operations, and a control unit that fetches instructions from the memory 114 and executes them by directing the coordinated operations of the ALU, registers and other components. The processor 108 may be a special-purpose computer designed to implement the functions disclosed herein.

In an embodiment, the virtual interaction engine 110 is implemented using logic units, FPGAS, ASICS, DSPS, or any other suitable hardware. The virtual interaction engine 110 may be configured to perform operations of the method 300 as described in FIGS. 3A-3C. For example, the virtual interaction engine 110 may be configured to facilitate the avatar 132 to conduct interactions with an entity within a virtual environment 130.

The memory 114 stores any of the information described above with respect to FIGS. 1 and 3A-3C along with any other data, instructions, logic, rules, or code operable to implement the function(s) described herein when executed by the processor 108. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store information security software instructions 116 which may comprise any suitable set of instructions, logic, rules, or code operable to execute the virtual interaction engine 110. Virtual interaction engine 110 may include, but is not limited to, one or more separate and independent software and/or hardware components of a metaverse server 104. In an example operation, the memory 114 may store a virtual operation interaction model 150, an application 152, an Internet of Things (IoT)-based call center 154, and other program models which executed by the processor 108 to implement operational flows of the system 100 of FIG. 1. The application 152 may be a metaverse application associated with an entity that provides application services to user avatars 132 associated with a user 101 and a user equipment 102 in a virtual environment 130. A user profile 134 may include a user credential 136. The user credential 136 associated with a user is registered with the entity through a user equipment 102 to interact with the metaverse server 104 and the call center server 170. A user profile 134 further includes a physical address, email address, phone number, and any other data, such as documents, files, media items, etc. The plurality of user profiles 134 may be stored by the processor 108 in the memory 114.

The virtual environment information 118 comprises user information 122 and environment information 124. The user information 122 generally comprises information that is associated with any user profiles 134 associated with user accounts that can be used within a virtual environment 130. The environment information 124 includes data of a virtual environment 130 corresponding to one or more virtual locations 125. For example, user information 122 may comprise user profile information, online account information, digital assets information, or any other suitable type of information that is associated with a user 101 within a virtual environment 130. The environment information 124 generally comprises information about the appearance of a virtual environment 130. For example, the environment information 124 may comprise information associated with objects, landmarks, buildings, structures, user avatars 132, virtual agents 164, virtual environment 130, or any other suitable type of element that is present within a virtual environment 130. In some embodiments, the environment information 124 may be used to create a representation of a virtual environment 130 for users 101. In this case, a virtual environment 130 may be implemented using any suitable type of software framework or engine.

Examples of a virtual environment 130 include, but are not limited to, a graphical or virtual representation of a metaverse, a map, a city, a building interior, a landscape, a fictional location, an alternate reality, or any other suitable type of location or environment. A virtual environment 130 may be configured to use realistic or non-realistic physics for the motion of objects within the virtual environment 130.

The real-world information 127 comprises user information 126 and environment information 128. The user information 126 generally comprises information that is associated with user profiles 134 and user accounts that can be used within the real world. For example, user information 126 may comprise user profile information, account information, or any other suitable type of information that is associated with a user within a real-world environment. The environment information 128 generally comprises information that is associated with an entity within the real world that the user 101 is a member of or is associated with. For example, the environment information 128 may comprise physical addresses, GPS based locations, phone numbers, email addresses, contact names, or any other suitable type of information that is associated with an entity. Since the metaverse server 104 has access to both the virtual environment information 118 and the real-world information 127, the metaverse server 104 may link the virtual environment information 118 and the real-world information 127 together for a user 101 such that changes to the virtual environment information 118 affect or propagate to the real-world information 127 of the real-world environment and vice-versa. The metaverse server 104 may be configured to store one or more maps that translate or convert different types of interactions between the real-world environment and the virtual environment 130 and vice-versa.

The metaverse server 104 may generate a virtual environment 130 based on the virtual environment information 118 and the real-world information 127 of the real-world environment. In some embodiments, the virtual environment 130 may be a metaverse branch of the entity. In one embodiment, the virtual environment 130 represents an entity at different physical geographic locations in the real-world environment. The metaverse server 104 may be configured to store one or more maps executed by the processor 108 that translate or convert different types of interactions occurred in and between the virtual environment 130 and the real-world environment.

Within the virtual environment 130, a user avatar 132 is generated by the processor 108 as a graphical representation of a user equipment 102 within the virtual environment 130. The user avatar 132 includes a plurality of features and characteristics which are processed by the processor 108 to present the user avatar 132 as the graphical representation of a user equipment 102 in the virtual environment 130. For example, the metaverse server 104 may receive a signal indicating a physical geographic location of the user equipment 102 and/or detect the user equipment 102 in the real-world environment. The metaverse server 104 may store the received signal in the memory 114. The metaverse server 104 may determine a virtual location 125 of the user avatar 132 associated with the user equipment 102 in the virtual environment 130 based on the physical geographic location of the user equipment 102. The metaverse server 104 may obtain the environment information 124 and environment information 128 associated with the virtual location 125 and the physical geographic location of the user equipment 102 in the real-world environment. The metaverse server 104 may generate and present a user avatar 132 in the virtual environment 130 based on the obtained environment information 124 and environment information 128. By using the user equipment 102, the avatar 132 can move or maneuver and interact with entities, other avatars, and objects within the virtual environment 130.

Network interface 112 is a hardware device that is configured to enable wired and/or wireless communications. The network interface 112 is configured to communicate data between user equipment 102 and other devices, systems, or domains. For example, the network interface 112 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 108 is configured to send and receive data using the network interface 112. The network interface 112 may be configured to use any suitable type of communication protocol as would be appreciated by one of ordinary skill in the art.

Call Center Server

Referring to FIG. 1, a call center server 170 is generally a server, or any other equipment configured to provide services and software and/or hardware resources to the metaverse server 104, user equipment 102, and agent equipment 162 via the network 120. The call center server 170 includes a memory 174 and a processor 171 operably coupled to the memory 174. The call center server 170 is configured to process data and communicate with the metaverse server 104 and user equipment 102 via the network 120. The call center server 170 is generally configured to perform the operations as described further below in conjunction with the operations as described in FIGS. 3A-3C. The memory 174 stores any of the information described above with respect to FIGS. 1 and 3A-3C along with any other data, instructions, logic, rules, or code operable to implement the function(s) described herein when executed by the processor 171. The memory 174 is operable to store software instructions 175 with a machine learning model 190 and the application 152 which may comprise any suitable set of instructions, logic, rules, or code operable to execute operations as described further below in conjunction with the operations as described in FIGS. 1 and 3A-3C. The application 152 may be an application associated with an entity that provides application services to user equipment 102 associated with a user 101 in a real-world environment 130. The software instructions 175 may include one or more the machine learning models 190 executed by the processor 171 to implement operational flows of FIGS. 3A-3C. For example, a machine learning model 190 may be one or more algorithms including support vector machine, neural network, random forest, k-means clustering, etc. The machine learning models 190 may be implemented by a plurality of neural network (NN) layers, Convolutional NN (CNN) layers, Long-Short-Term-Memory (LSTM) layers, Bi-directional LSTM layers, Recurrent NN (RNN) layers, and the like.

The memory 174 may be operable to store user profiles 134 with a user identifier 135, user credentials 136, service inquiries 146 with service issues 148, real-world agent profiles 161, an expandable pool of virtual agents 164[1]-[n], observation operations 176, rule sets 177, customized solutions 178 of the service issues 148 associated with various products and services provided by the entity, etc. A real-world agent profile 161 may include real-world agent identifier, one or more skills and data of one or more virtual agents each associated with a corresponding skill. The expandable pool of virtual agents 164[1]-[n] comprises virtual agent identifiers 165 and skills 166 associated with corresponding virtual agents 164[1]-[n], such as the virtual agents 164[1]-[3] illustrated in FIG. 1.

The call center server 170 may include a network interface 173 which is configured to enable wired and/or wireless communications (e.g., via network 120). The network interface 173 may be configured to communicate data among the call center server 170, the metaverse server 104, the user equipment 102, databases, systems, or domains. The processor 171 is configured to send and receive data using the network interface 173. The network interface 173 may be configured to use any suitable type of communication protocol as would be appreciated by one of ordinary skill in the art. For example, the network interface 173 may comprise a WIFI interface, a local area network (LAN) interface, a wide area network (WAN) interface, a modem, a switch, or a router.

Central Database

Central database 180 may be a remote database, a cloud database, or an on-site internal database. Central database 180 may be coupled to or in communication with and accessed by the call center server 170 and the metaverse server 104 via the network 120. As illustrated in FIG. 1, the central database 180 may be a remote database and stores historical interaction data 140 including historical observation operations 141, historical rule sets 142 applied by the corresponding real-world agents 160 to address historical service issues 143, historical service issues 143, and historical solutions 144. The historical interaction data 140 may be accessed by the call center server 170 to obtain the historical interaction data 140 for generating an expandable pool of the virtual agents 164[1]-[n].

Virtual Interaction Engine

In some embodiments, the virtual interaction engine 110 may be implemented by the processor 108 of a metaverse server 104 to execute information security software instructions 116 to create a virtual environment 130 and generate user avatars 132 associated with user equipment 102 associated with users 101 in a virtual environment 130. The virtual interaction engine 110 may be implemented by the processor 108 to execute the information security software instructions 116 to identify an expandable pool of the virtual agents 164[1]-[n] in a virtual environment 130 and identify a virtual agent 164 with a particular skill 166 based on a service issue 148. The virtual interaction engine 110 may be implemented by the processor 108 to execute a virtual operation interaction model 150 to conduct an interaction between the virtual agent 164 and the user avatar 132 associated with the user equipment 102 of the user 101. Further, the virtual interaction engine 110 may be implemented by the processor 108 to execute a virtual operation interaction model 150 to generate a customized solution 178 to address the service issue 148. The operation of the system 100 is described in FIGS. 1 and 3A-3C below.

Generate an Expandable Pool of Virtual Agents

The system 100 may be implemented by the call center server 170 in communication with the metaverse server 104 via a network 120. The call center server 170 and the metaverse server 104 are in communication with a central database 180. The central database 180 stores historical interaction data 140 associated with a plurality of real-world agents 160. The historical interaction data 140 comprises a plurality of historical observation operations 141 performed by plurality of the real-world agents 160 and historical rule sets 142 applied by the corresponding real-world agents 160 to address historical service issues 143. The historical service issues 143 may associated with various products and services provided by the entity. For example, the historical service issues 143 may include a user profile update, questions about interactions associated with various products or services provided by the entity, etc. The historical observation operations 141 performed by the real-world agents 160 are associated with the historical rule sets 142 which are applied by the real-world agents 160 through corresponding agent equipment 162 to address the historical service issues 143.

In some embodiments, the call center server 170 may access the central database 180 to receive at least a portion of the plurality of the historical observation operations 141 performed by a particular real-world agent 160 in response to a historical service issue 143. The call center server 170 may identify at least a portion of the plurality of historical rule sets 142 applied by the particular real-world agent 160 through the agent equipment 162 to address the historical service issue 143. The call center server 170 may use a machine learning model 190 to train each virtual agent 164 of the expandable pool of virtual agents 164[1]-[n] to have a unique skill of solving a historical service issue 143. Each virtual agent 164 may be trained based on the historical observation operations 141 performed by the particular real-world agent 160 and a historical rule set 142 to address the historical service issue 143. The call center server 170 generates an expandable pool of virtual agents 164 associated with a plurality of skills 166 of the particular real-world agents 160.

In some embodiments, the call center server 170 may continuously receive new interaction data between a user equipment 102 of the user 101 and the agent equipment 162 of the real-world agent 160 for solving a service issue 148 associated with a service inquiry 146. The new interaction data may include new observed operations, a new rule set, a new solution provided by a particular real-world agent 160 to address the service issue 148. The call center server 170 may determine whether a new skill is required for a particular real-world agent 160 to address the service issue 148. In one embodiment, the call center server 170 may determine that the service issue 148 is a historical service issue 143 and a new skill is not required for the particular real-world agent 160 to address the service issue 148. The call center server 170 may use the machine learning model 190 to continuously train or retrain the particular virtual agent 164 associated with the skill 166 with the new interaction data. The call center server 170 may update the data associated with the particular virtual agent 164 in the expandable pool of the virtual agents 164[1]-[n].

In one embodiment, the call center server 170 may determine that a new skill is required for a real-world agent 160 to address the service issue 148. For example, the service issue 148 may be a new service issue. The new service issue 148 may be associated with an updated product or service provided by the entity. The call center server 170 may use the machine learning model 190 to train a new virtual agent 164 associated with the new skill 166 based on the new interaction data. The call center server 170 may update the expandable pool of the plurality of the virtual agents 164[1]-[n] with the new virtual agent 164. The call center server 170 may generate a new virtual agent identifier 165 associated with the new virtual agent 164 and the new skill for solving the service issue 148.

The call center server 170 may communicate data of the expandable pool of the virtual agents 164[1]-[n] to the metaverse server 104. The data of the expandable pool of the virtual agents 164[1]-[n] may include virtual agent identifiers 165, skills 166 associated with the virtual agents 164 to address corresponding service issues, locations of real-world agent 160 associated with the virtual agents 164[1]-[n], and any other data associated with operations of the virtual agents. The metaverse server 104 may identify the expandable pool of the virtual agents 164[1]-[n] in the virtual environment 130 based on the data of the expandable pool of the virtual agents 164[1]-[n].

Implement an Interaction Between the First Virtual Agent and the User Avatar to Generate a Customized Solution to Address the Service Issue In some embodiments, the call center server 170 may receive a service inquiry 146 with a service issue 148 from a user equipment 102 associated with a user 101. A service issue 148 may be indicative of a problem that a user experiences with a product or service associated with the entity. The call center server 170 may receive an service inquiry 146 with a service issue 148 from a first user equipment 102. For example, the call center server 170 may include an Interactive voice response (IVR) to receive and process the service inquiry 146. The IVR may be configured to perform a skill-based routing to identify the service issue 148 and a corresponding skill 166 associated with a particular real-world agent 160 to address the service issue 148. For example, the particular real-world agent 160 may handle a service issue 148, such as a fraudulent interaction. The call center server 170 may determine whether the particular real-world agent 160 is available to respond to the service inquiry 146 through the agent equipment 162. In response to determining that the particular real-world agent 160 is not available to respond to the service inquiry 146, the call center server 170 routes the service inquiry 146 with the service issue 148 to the metaverse server 104.

In some embodiments, the metaverse server 104 may identify the particular virtual agent 164 associated with the skill 166 to address the service issue 148 in the virtual environment 130. The metaverse server 104 may request the user avatar 132 to provide a user credential 136 before authorizing the user avatar 132 to interact with a virtual agent 164 in the virtual environment 130. In response to receiving the user credential 136 from the user avatar 132, the metaverse server 104 may conduct the first interaction between the first virtual agent 164[1] and the user avatar 132. The first virtual agent 164[1] may start an interaction (e.g., a call) with the user avatar 132 and provide a customized solution 178 to the service issue 148 of the service inquiry 146. The customized solution 178 may be provided by the first virtual agent 164[1] based on data of the service issue 148 of the service inquiry 146, the first skill 166 [1] associated with the first virtual agent 164[1], and historical user interaction data 138 of the user profile 134. The metaverse server 104 may present the customized solution 178 to the user equipment 102 associated with the user avatar 132. The customized solution 178 may include text, audio or video information.

Generate a Dynamic Virtual Hold Room to Provide Customized Bi-Directional Interactions Between the User Avatar and a Virtual Agent In some embodiments, the system 100 may create a virtual hold room 131 to provide a customized bi-directional interaction with a user 101 in a virtual environment 130.

Conventionally, the hold treatment for the user 101 in a call center environment is generic and static by providing a preconfigured list of information captured into audio files. In some embodiments, the virtual hold room 131 may be a digital and virtual interactive place to provide the customized bi-directional interaction with a user avatar 132 in the virtual environment 130. In one example, the virtual hold room 131 may be a virtual interactive place where a user 101 associated with the user avatar 132 is on hold for a transition time before the user 101 is connected to a virtual agent 164 through the user avatar 132. In another example, the virtual hold room 131 may be a virtual interactive place where the user 101 associated with the user avatar 132 is on hold for a transition time before the user 101 is connected to a real-world agent 160 associated with the agent equipment 162 in a real-world environment. The virtual hold room 131 offers a personalized experience for the user avatar 132 associated with the user 101. For example, the metaverse server 104 may present the interaction with audio and video in real-time in a way that the user 101 interacts with the virtual agent 164 with a constant engagement with the entity. The virtual hold room 131 is interactive and bi-directional based on user profiles and user interactions with the entity in the virtual environment 130. The user 101 may not just receive messages from the virtual agent 164, but the user avatar 132 may interact with a virtual agent 164 of the entity in the virtual hold room 131 and engage with a customized offer to complete the acceptance. In one embodiment, the user 101 may inquire for more details of the customized offer and receive even more customized information. For example, the user avatar 132 of the user 101 may ask the virtual agent 164 how much rewards may have been earned through the travel rewards credit card during the past period of time. The metaverse server 104 may analyze articular user activity patterns to determine the rewards that would have been earned if the user 101 has the travel rewards credit card.

For example, the metaverse server 104 may receive the service inquiry 146 routed from the call center server 170. The metaverse server 104 creates a digital virtual hold room 131 in response to receiving the service inquiry 146. The metaverse server 104 may identify the service issue 148 of the service inquiry 146 from the user avatar 132. The metaverse server 104 retrieves a user profile 134 from the memory 114. The metaverse server 104 may analyze historical user interaction data 138 in the user profile 134. The historical user interaction data 138 may include data associated with opened accounts, spend patterns, products and services obtained or to be obtained from the entity, loan details, etc. the service issue 148 may include a user question about the user profile 134, such as a credit card. The metaverse server 104 may determine an activity associated with the user 101. The metaverse server 104 may identify one or more services corresponding to the activity for the user 101. For example, the metaverse server 104 may determine that the user 101 has a lot of travel with a credit card with the entity (e.g., a bank) but doesn't receive any travel rewards. The metaverse server 104 may generate a customized or personalized service (e.g., a first offer) to the user 101 with the travel reward for the credit card associated with the user profile 134. In response to receiving the customized offer, the user avatar 132 may provide updated information and ask a virtual agent 164 for more details. In response to receiving the updated information from the user avatar 132, the metaverse server 104 generates an updated customized offer (e.g., a second offer). The metaverse server 104 may send the updated customized offer to the user avatar 132 through the virtual agent 164. The user avatar 132 accepts the updated customized offer for the user 101. The metaverse server 104 may store the updated customized offer in the user profile 134. The virtual hold room 131 may dynamically provide customized interactive experience associated with various entity products and services (e.g., sales, card opening, investments, etc.).

Implementing Contactless Calls to an IoT-Based Call Center

In some embodiments, the system 100 may implement contactless calls or interactions to an Internet of Things (IoT)-enabled call center in a virtual environment 130. In one embodiment, the service inquiry 146 may be pre-scheduled in an Internet of Things (IoT) calendar 168 at a scheduled time to connect an IoT-based call center. The call center server 170 may route the service inquiry 146 to the metaverse server 104. For example, a user 101 may set up an event using a user equipment 102 in an Internet of Things (IoT) calendar 168 with instructions to pre-schedule a call to an IoT-based call center 154. The IoT-based call center 154 may be a software model with instructions which is executed by the processor 108 of the metaverse server 104 to implement an interaction between a user avatar 132 and a virtual agent 164 in the virtual environment 130. The user 101 may provide a user avatar 132 with instructions on a buy or sell trade or to check whether a refund is made by an entity to a user account associated with the user profile 134 at a particular time. A metaverse server 104 may trigger the service inquiry 146 or the scheduled event in the IoT calendar 168 at the time for the user avatar 132 to make a call to the IoT-based call center 154 in the virtual environment 130. The user avatar 132 automatically initiates the call to the IoT-based call center 154 at the particular time in the virtual environment 130. The metaverse server 104 may identify a virtual agent 164 with a skill 166 to check the user account associated with the user profile 134. The metaverse server 104 may establish an interaction between the user avatar 132 and the virtual agent 164 in the virtual environment 130. The user avatar 132 conducts the call on behalf of the user 101 with the virtual agent 164. For example, the user avatar 132 performs some initial steps with the virtual agent 164 on behalf of the user 101 (e.g., identifying the user identity with user authentication information, explaining the problem faced to the virtual agent 164, any other initial steps needed to connect with the virtual agent 164 or a human agent, etc.). In another example, when the call is connected, the human user can join the call without waiting for a long time to receive a response from a real-world agent 160 from the call center.

The system 100 may integrate an IoT-based call center 154 and a user avatar 132 with a virtual agent 164 in the virtual environment 130 to facilitate automatic query processing, form submission, and other activities on behalf of human user but without actual human user involvement until needed. The system 100 may automatically provide contactless calls by scheduling calls in advance and accomplish tasks over the call by a user avatar 132 without human interaction.

Figure 3A:
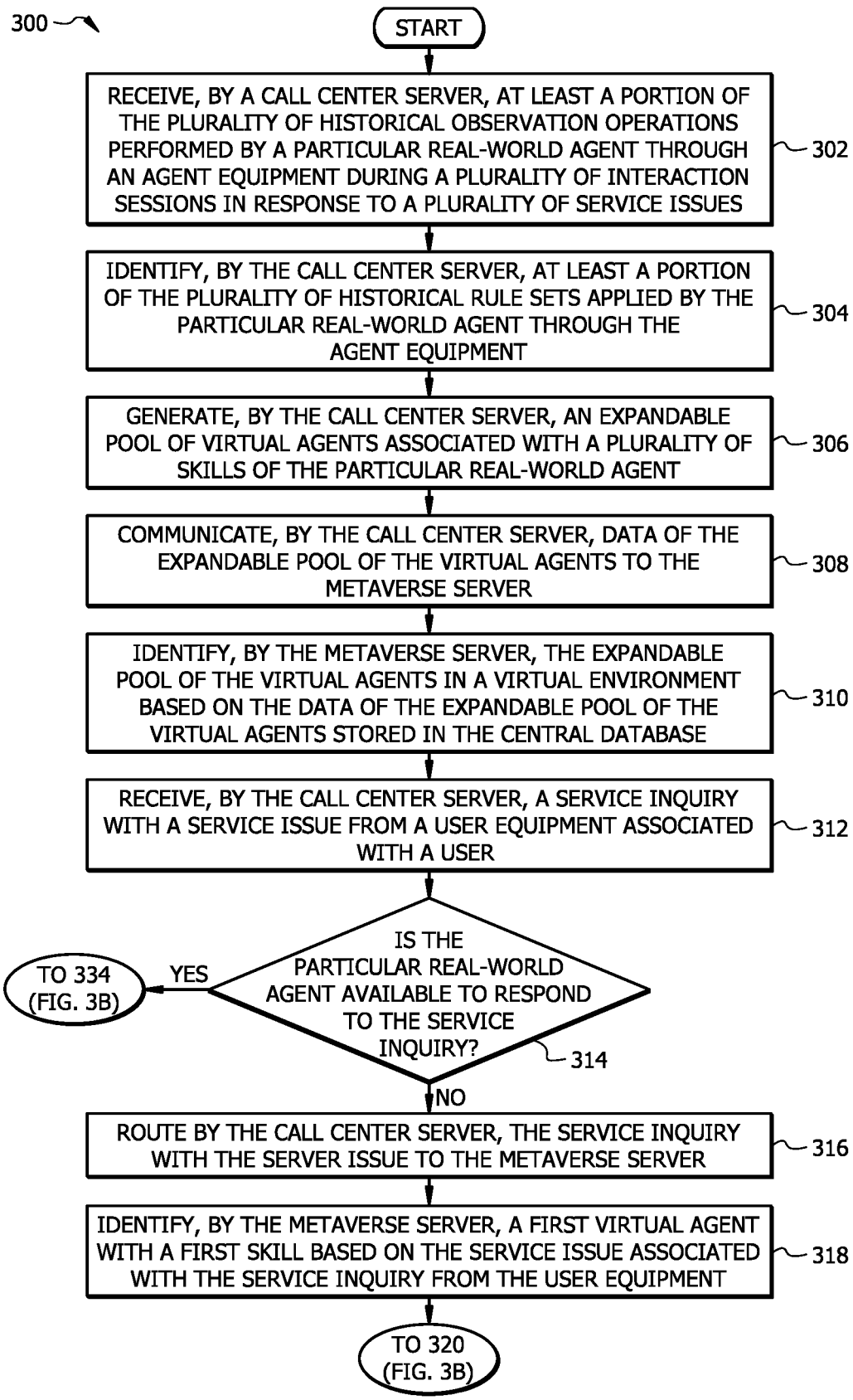
FIGS. 3A-3C illustrate an example operational flow of a method for generating an expandable pool of virtual agents in the virtual environment.
Figure 3B:
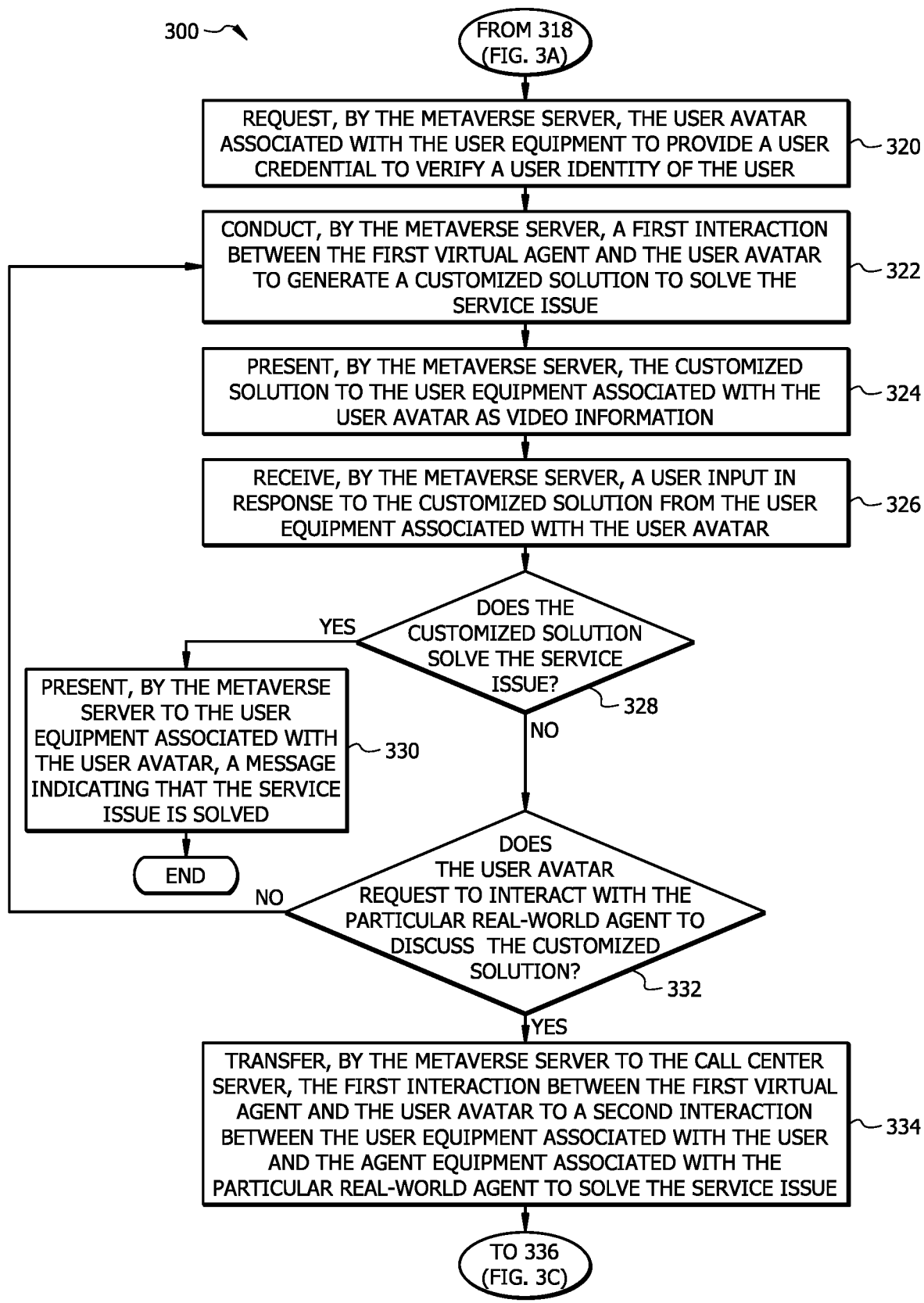
Figure 3C:
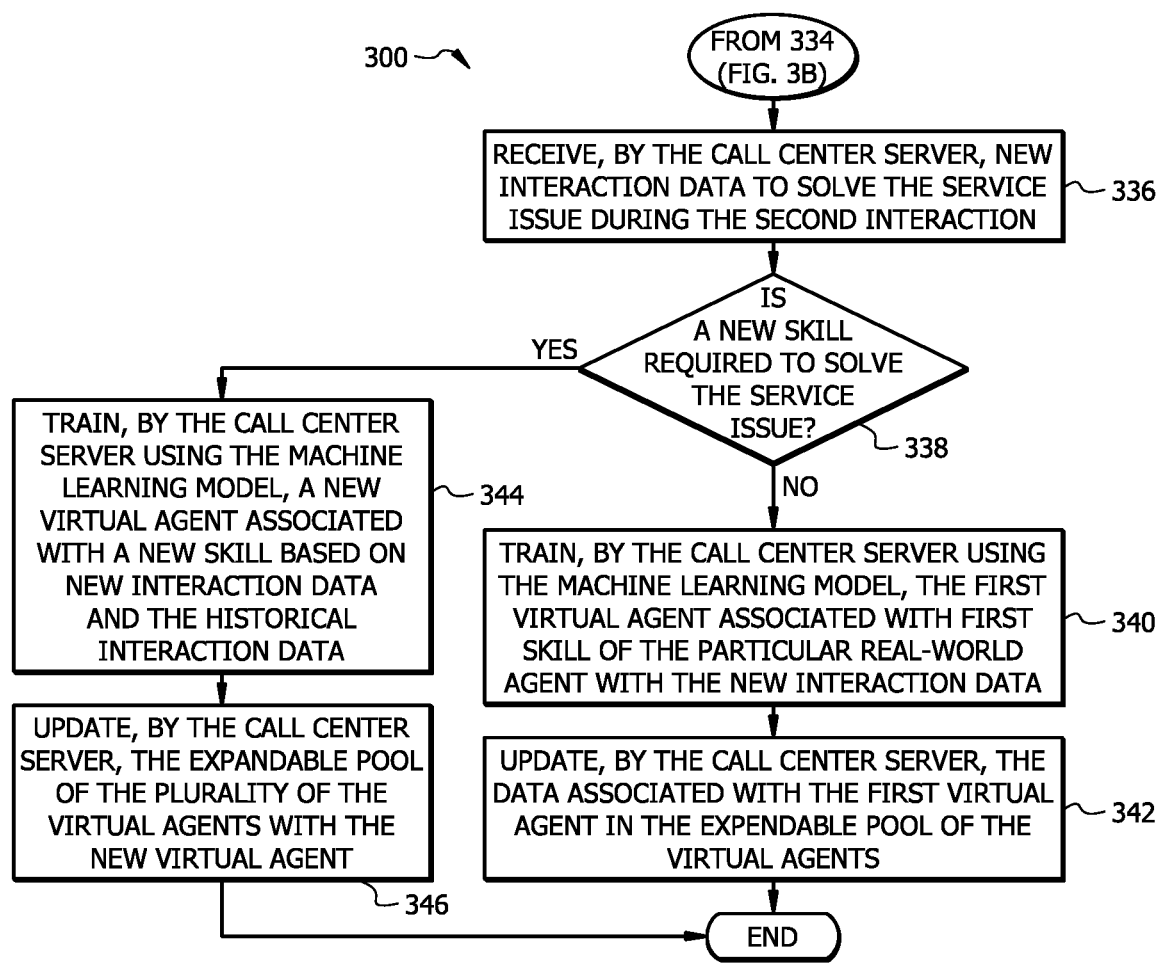

Example Operational Flow for Operations of Implementing Intelligent Interactions to Complete an Interaction Session to Obtain a Digital Item in the Virtual Environment FIGS. 3A-3C illustrate an example operational flow of a method 300 for generating an expandable pool of virtual agents 164[1]-[n] to provide solutions in the virtual environment 130. Modifications, additions, or omissions may be made to method 300. Method 300 may include more, fewer, or other operations may be performed by the metaverse server 104 and the call center server 170 in parallel or in any suitable order. While at times discussed as the system 100, processor 108, processor 171, virtual interaction engine 110, information security software instructions 116, software instructions 175, or components of any of thereof performing operations, any suitable system or components of the system 100 may perform one or more operations of the method 300. For example, one or more operations of method 300 may be implemented, at least by the metaverse server 104 and the call center server 170 to perform operations 302-342.

The method 300 begins at operation 302 where the call center server 170 receives at least a portion of the plurality of the historical observation operations 141 performed by a particular real-world agent 160 through an agent equipment 162 during a plurality of interaction sessions in response to a plurality of historical service issues 143.

At operation 304, the call center server 170 identifies at least a portion of the plurality of historical rule sets 142 applied by the particular real-world agent 160 through the agent equipment 162. The plurality of the historical rule sets 142 are configured to provide corresponding solutions in response to the plurality of the service issues 143. For the particular real-world agent 160, the call center server 170 may access the central database 180 to receive at least a portion of the plurality of the historical observation operations 141 and identify the corresponding historical rule sets 142 applied by the particular real-world agent 160.

At operation 306, the call center server 170 generates an expandable pool of virtual agents 164[1]-[n] associated with a plurality of skills 166 of the particular real-world agent 160. Each virtual agent 164 of the expandable pool of virtual agents 164[1]-[n] is trained to have a unique skill of solving a corresponding service issue 143 using a machine learning model 190. Each virtual agent 164 may be trained based on the historical observation operations 141 performed by the particular real-world agent 160 and a historical rule set 142 to address the historical service issue 143.

At operation 308, the call center server 170 communicates data of the expandable pool of the virtual agents 164[1]-[n] to the metaverse server 104. The data of the expandable pool of the virtual agents 164[1]-[n] may include virtual agent identifiers 165, a plurality of skills 166 associated with the virtual agents 164 to address corresponding service issues, locations of real-world agent 160 associated with the virtual agents 164[1]-[n], and any other data associated with operations of the virtual agents.

At operation 310, the metaverse server 104 identifies the expandable pool of the virtual agents 164[1]-[n] in a virtual environment 130 based on the data of the expandable pool of the virtual agents 164[1]-[n].

At operation 312, the call center server 170 receives a service inquiry 146 with a service issue 148 from a user equipment 102 associated with a user 101.

At operation 314, the call center server 170 determines whether the particular real-world agent 160 is available to respond to the service inquiry 146 through the agent equipment 162.

At operation 316, in response to determining that the particular real-world agent 160 is not available to respond to the service inquiry 146 through the agent equipment 162, the call center server 170 routes the service inquiry 146 with the service issue 148 to the metaverse server 104.

At operation 318, the metaverse server 104 identifies a first virtual agent 164[1] from the expandable pool of the virtual agents 164 in response to receiving the service inquiry 146 with the service issue 148. The first virtual agent 164[1] is associated with a first skill 166[1] based on the service issue 148 associated with the service inquiry 146 from the user equipment 102.

At operation 320, in response to receiving the service inquiry 146 from the call center server 170, the metaverse server 104 requests the user avatar 132 associated with the user equipment 102 to provide a user credential 136 associated with a user profile 134 to verify a user identity of the user 101.

At operation 322, in response to receiving the user credential 136 from the user avatar 132, the metaverse server 104 conducts the first interaction between the first virtual agent 164[1] and the user avatar 132 to generate the customized solution 178 to address the service issue 148. The customized solution 178 may be generated based on data of the service issue 148 of the service inquiry 146, the first skill 166[1] associated with the first virtual agent 164[1], and historical user interaction data 138 of the user profile 134.

At operation 324, the metaverse server 104 presents the customized solution 178 to the user equipment 102 associated with the user avatar 132 as video information or other digital information.

At operation 326, the metaverse server 104 receives a user input 103 in response to the customized solution 178 from the user equipment 102 associated with the user avatar 132.

At operation 328, the metaverse server 104 determines whether the customized solution 178 addresses the service issue 148 based on the user input 103.

At operation 330, in response to determining that the customized solution 178 addresses the service issue 148, the metaverse server 104 presents to the user equipment 102 associated with the user avatar 132, a message which indicates that the service issue 148 is addressed.

At operation 332, in response to determining that the customized solution 178 does not address the service issue 148, the metaverse server 104 may determine whether the user avatar 132 requests to interact with the particular real-world agent 160 to discuss the customized solution 178.

At operation 334, in response to determining that the user avatar 132 requests to interact with the particular real-world agent 160 to discuss the customized solution 178 and that the particular real-world agent 160 is available to respond to the service inquiry 146, the metaverse server 104 transfers, to the call center server 170, the first interaction between the first virtual agent 164[1] and the user avatar 132 to a second interaction between the user equipment 102 associated with the user 101 and the agent equipment 162 associated with the particular real-world agent 160 to address the service issue 148.

At operation 336, the call center server 170 receives new interaction data to address the service issue during the second interaction. The new interaction data comprises new observation operations 176 performed by the particular real-world agent 160 and a new rule set 177 applied by the particular real-world agent 160 through the agent equipment 162 to address the service issue 148.

At operation 338, the call center server 170 determines whether a new skill required to address the service issue 148.

At operation 340, in response to determining that a new skill is not required to address the service issue 148, the call center server 170 trains, using the machine learning model 190, the first virtual agent 164[1] associated with the first skill 166 [1] of the particular real-world agent 160 with the new interaction data.

At operation 342, the call center server 170 updates the data associated with the first virtual agent 164[1] in the expandable pool of the virtual agents 164[1]-[n].

At operation 344, in response to determining that the new skill is required to address the service issue 148, the call center server 170 trains, using the machine learning model 190, a new virtual agent 164 associated with the new skill based on the new interaction data; and At operation 346, the call center server 170 updates the expandable pool of the plurality of the virtual agents 164 [1]-[n] with the new virtual agent 164. The new virtual agent 164 is associated with a new virtual agent identifier 165 and the new skill for solving the service issue 148.

In some embodiments, the metaverse server 104 may identify a first skill 166 [1] and a second skill 166 [2] to address the service issue 148 associated with the service inquiry 146 from the user equipment 102. Based on the expandable pool of the virtual agents 164[1]-[n], the metaverse server 104 may identify, the first virtual agent 164[1] associated with the first skill 166 [1] and a second virtual agent 164[2] associated with the second skills 166 [2] based on the service issue 148 associated with the service inquiry 146 from the user equipment 102. The metaverse server 104 may establish a third interaction between the first virtual agent 164[1], the second virtual agent 164[2], and the user avatar 132 associated with the user equipment 102 of the user 101 to generate the customized solution 178 to address the service issue 148 in the virtual environment 130.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system comprising:
a call center server in communication with a metaverse server via a network, wherein the call center server and the metaverse server are in communication with a central database, wherein a central database stores historical interaction data associated with a plurality of real-world agents, wherein the historical interaction data comprises a plurality of historical observation operations and historical rule sets applied by the corresponding real-world agents to address historical service issues;

the call center server further comprising a first processor configured to:
receive at least a portion of the plurality of historical observation operations performed by a particular real-world agent through an agent equipment during a plurality of interaction sessions in response to a plurality of service issues;
identify at least a portion of the plurality of historical rule sets applied by the particular real-world agent through the agent equipment, wherein the plurality of the historical rule sets are configured to provide corresponding solutions in response to the plurality of the service issues;
generate an expandable pool of virtual agents associated with a plurality of skills of the particular real-world agent, wherein each virtual agent of the expandable pool of virtual agents is trained to have a unique skill of solving a corresponding service issue using a machine learning model based on the historical observation operations performed by the particular real-world agent and a historical rule set to address the service issue;
communicate data of the expandable pool of the virtual agents to the metaverse server;
receive a service inquiry with a service issue from a user equipment associated with a user;
determine whether the particular real-world agent is available to respond to the service inquiry through the agent equipment;
in response to determining that the particular real-world agent is not available to respond to the service inquiry through the agent equipment, route the service inquiry with the service issue to the metaverse server;

the metaverse server further comprising a second processor configured to:
identify the expandable pool of the virtual agents in a virtual environment based on the data of the expandable pool of the virtual agents;
identify a first virtual agent from the expandable pool of the virtual agents, wherein the first virtual agent is associated with a first skill based on the service issue associated with the service inquiry from the user equipment; and
conduct a first interaction between the first virtual agent and a user avatar associated with the user equipment of the user.

2. The system of claim 1, wherein the first processor of the metaverse server is further configured to:
in response to receiving the service inquiry from the call center server, request the user avatar associated with the user equipment to provide a user credential associated with a user profile to verify a user identity of the user;
in response to receiving the user credential from the user avatar, conduct the first interaction between the first virtual agent and the user avatar to generate a customized solution to address the service issue, wherein the customized solution is provided by the first virtual agent based on data of the service issue of the service inquiry, the first skill associated with the first virtual agent, and historical user interaction data of the user profile; and
present the customized solution to the user equipment associated with the user avatar as video information.

3. The system of claim 2, wherein the first processor of the metaverse server is further configured to:

receive a user input in response to the customized solution from the user equipment associated with the user avatar;

determine, based on the user input, whether the customized solution addresses the service issue; and in response to determining that the customized solution addresses the service issue, present, to the user equipment associated with the user avatar, a message indicating that the service issue is addressed.

4. The system of claim 3, wherein the first processor of the metaverse server is further configured to:

in response to determining that the customized solution does not address the service issue, determine whether the user avatar requests to interact with the particular real-world agent to discuss the customized solution; and in response to determining that the user avatar requests to interact with the particular real-world agent to discuss the customized solution and that the particular real-world agent is available to respond to the service inquiry, transfer, to the call center server, the first interaction between the first virtual agent and the user avatar to a second interaction between the user equipment associated with the user and the agent equipment associated with the particular real-world agent to address the service issue.

5. The system of claim 4, wherein the second processor of the call center server is further configured to:

receive new interaction data to address the service issue during the second interaction, wherein the new interaction data comprises new observation operations performed by the particular real-world agent and a new rule set applied by the particular real-world agent through the agent equipment to address the service issue;

determine whether a new skill is required to address the service issue;

in response to determining that a new skill is not required to address the service issue, train, using the machine learning model, the first virtual agent associated with the first skill of the particular real-world agent with the new interaction data; and update the data associated with the first virtual agent in the expandable pool of the virtual agents.

6. The system of claim 5, wherein the second processor of the call center server is further configured to:

in response to determining that the new skill is required to address the service issue, train, using the machine learning model, a new virtual agent associated with the new skill based on the new interaction data; and update the expandable pool of the plurality of the virtual agents with the new virtual agent, the new virtual agent being associated with a new virtual agent identifier and the new skill for solving the service issue.

7. The system of claim 1, wherein the first processor of the metaverse server is further configured to:

identify a first skill and a second skill to address the service issue associated with the service inquiry from the user equipment;

identify, from the expandable pool of the virtual agents, the first virtual agent associated with the first skill and a second virtual agent associated with the second skill based on the service issue associated with the service inquiry from the user equipment; and establish a third interaction between the first virtual agent, the second virtual agent, and the user avatar associated with the user equipment of the user to generate the customized solution to address the service issue in the virtual environment.

8. A method comprising:

receiving, by a call center server from a central database, at least a portion of a plurality of historical observation operations performed by a particular real-world agent through an agent equipment during a plurality of interaction sessions in response to a plurality of service issues, wherein the call center server is in communication with a central database and a metaverse server via a network;

identifying, by the call center server, at least a portion of the plurality of historical rule sets applied by the particular real-world agent through the agent equipment, wherein the plurality of the historical rule sets are configured to provide corresponding solutions in response to the plurality of the service issues;

generating, by the call center server, an expandable pool of virtual agents associated with a plurality of skills of the particular real-world agent, wherein each virtual agent of the expandable pool of virtual agents is trained to have a unique skill of solving a corresponding service issue using a machine learning model based on the historical observation operations performed by the particular real-world agent and a historical rule set to address the service issue;

communicating, by the call center server, data of the expandable pool of the virtual agents to the metaverse server;

identifying, by the metaverse server, the expandable pool of the virtual agents in a virtual environment based on the data of the expandable pool of the virtual agents;

receiving, by the call center server, a service inquiry with a service issue from a user equipment associated with a user;

determining, by the call center server, whether the particular real-world agent is available to respond to the service inquiry through the agent equipment;

in response to determining that the particular real-world agent is not available to respond to the service inquiry through the agent equipment, routing, by the call center server, the service inquiry with the service issue to the meta verse server;

identifying, by the metaverse server, a first virtual agent from the expandable pool of the virtual agents, wherein the first virtual agent is associated with a first skill based on the service issue associated with the service inquiry from the user equipment; and conducting, by the metaverse server, a first interaction between the first virtual agent and a user avatar associated with the user equipment of the user.

9. The method of claim 8, further comprising:

in response to receiving the service inquiry from the call center server, requesting, by the metaverse server, the user avatar associated with the user equipment to provide a user credential associated with a user profile to verify a user identity of the user;

in response to receiving the user credential from the user avatar, conducting, by the metaverse server, the first interaction between the first virtual agent and the user avatar to generate a customized solution to address the service issue, wherein the customized solution is provided by the first virtual agent based on data of the service issue of the service inquiry, the first skill associated with the first virtual agent, and historical user interaction data of the user profile; and presenting, by the metaverse server, the customized solution to the user equipment associated with the user avatar as video information.

10. The method of claim 9, further comprising:

receiving, by the metaverse server, a user input in response to the customized solution from the user equipment associated with the user avatar;

determining, by the metaverse server based on the user input, whether the customized solution addresses the service issue; and in response to determining that the customized solution addresses the service issue, presenting, by the metaverse server to the user equipment associated with the user avatar, a message indicating that the service issue is addressed.

11. The method of claim 10, further comprising:

in response to determining that the customized solution does not address the service issue, determining, by the metaverse server, whether the user avatar requests to interact with the particular real-world agent to discuss the customized solution; and in response to determining that the user avatar requests to interact with the particular real-world agent to discuss the customized solution and that the particular real-world agent is available to respond to the service inquiry, transferring, by the metaverse server to the call center server, the first interaction between the first virtual agent and the user avatar to a second interaction between the user equipment associated with the user and the agent equipment associated with the particular real-world agent to address the service issue.

12. The method of claim 11, further comprising:

by the call center server, receiving new interaction data to address the service issue during the second interaction, wherein the new interaction data comprises new observation operations performed by the particular real-world agent and a new rule set applied by the particular real-world agent through the agent equipment to address the service issue;

determining whether a new skill is required to address the service issue;

in response to determining that a new skill is not required to address the service issue, training, using the machine learning model, the first virtual agent associated with the first skill of the particular real-world agent with the new interaction data; and updating the data associated with the first virtual agent in the expandable pool of the virtual agents.

13. The method of claim 12, further comprising:

in response to determining that the new skill is required to address the service issue, training, by the call center server using the machine learning model, a new virtual agent associated with the new skill based on the new interaction data; and updating, by the call center server, the expandable pool of the plurality of the virtual agents with the new virtual agent, the new virtual agent being associated with a new virtual agent identifier and the new skill for solving the service issue.

14. The method of claim 8, further comprising:

by the metaverse server, identifying a first skill and a second skill to address the service issue associated with the service inquiry from the user equipment;

identifying, from the expandable pool of the virtual agents, the first virtual agent associated with the first skill and a second virtual agent associated with the second skill based on the service issue associated with the service inquiry from the user equipment; and establishing a third interaction between the first virtual agent, the second virtual agent, and the user avatar associated with the user equipment of the user to generate the customized solution to address the service issue in the virtual environment.

15. A method comprising:

receiving, by a call center server from a central database, at least a portion of a plurality of historical observation operations and at least a portion of the plurality of historical rule sets applied by the particular real-world agent a particular real-world agent through an agent equipment during a plurality of interaction sessions in response to a plurality of service issues, wherein the call center server is in communication with a central database and a metaverse server via a network;

generating, by the call center server, an expandable pool of virtual agents associated with a plurality of skills of the particular real-world agent, wherein each virtual agent of the expandable pool of virtual agents is trained to have a unique skill of solving a corresponding service issue using a machine learning model based on the historical observation operations performed by the particular real-world agent and a historical rule set to address the service issue;

communicating, by the call center server, data of the expandable pool of the virtual agents to the metaverse server;

receiving, by the call center server, a service inquiry with a service issue from a user equipment associated with a user;

determining the particular real-world agent is not available to respond to the service inquiry through the agent equipment;

routing, by the call center server, the service inquiry with the service issue to the metaverse server;

identifying, by the metaverse server, a first virtual agent from the expandable pool of the virtual agents in a virtual environment, wherein the first virtual agent is associated with a first skill based on the service issue associated with the service inquiry from the user equipment; and conducting, by the metaverse server, a first interaction between the first virtual agent and a user avatar associated with the user equipment of the user.

16. The method of claim 15, further comprising:

in response to receiving the service inquiry from the call center server, requesting, by the metaverse server, the user avatar associated with the user equipment to provide a user credential associated with a user profile to verify a user identity of the user;

in response to receiving the user credential from the user avatar, conducting, by the metaverse server, the first interaction between the first virtual agent and the user avatar to generate a customized solution to address the service issue, wherein the customized solution is provided by the first virtual agent based on data of the service issue of the service inquiry, the first skill associated with the first virtual agent, and historical user interaction data of the user profile; and presenting, by the metaverse server, the customized solution to the user equipment associated with the user avatar as video information.

17. The method of claim 16, further comprising:

receiving, by the metaverse server, a user input in response to the customized solution from the user equipment associated with the user avatar;

determining, by the metaverse server based on the user input, whether the customized solution addresses the service issue; and in response to determining that the customized solution addresses the service issue, presenting, by the metaverse server to the user equipment associated with the user avatar, a message indicating that the service issue is addressed.

18. The method of claim 17, further comprising:

in response to determining that the customized solution does not address the service issue, determining, by the metaverse server, whether the user avatar requests to interact with the particular real-world agent to discuss the customized solution; and in response to determining that the user avatar requests to interact with the particular real-world agent to discuss the customized solution and that the particular real-world agent is available to respond to the service inquiry, transferring, by the metaverse server to the call center server, the first interaction between the first virtual agent and the user avatar to a second interaction between the user equipment associated with the user and the agent equipment associated with the particular real-world agent to address the service issue.

19. The method of claim 18, further comprising:

by the call center server, receiving new interaction data to address the service issue during the second interaction, wherein the new interaction data comprises new observation operations performed by the particular real-world agent and a new rule set applied by the particular real-world agent through the agent equipment to address the service issue;

determining whether a new skill required to address the service issue;

in response to determining that a new skill is not required to address the service issue, training, using the machine learning model, the first virtual agent associated with the first skill of the particular real-world agent with the new interaction data;

updating the data associated with the first virtual agent in the expandable pool of the virtual agents;

in response to determining that the new skill is required to address the service issue, training, by the call center server using the machine learning model, a new virtual agent associated with the new skill based on the new interaction data; and updating, by the call center server, the expandable pool of the plurality of the virtual agents with the new virtual agent, the new virtual agent being associated with a new virtual agent identifier and the new skill for solving the service issue.

20. The method of claim 15, further comprising:

by the metaverse server, identifying a first skill and a second skill to address the service issue associated with the service inquiry from the user equipment;

identifying, from the expandable pool of the virtual agents, the first virtual agent associated with the first skill and a second virtual agent associated with the second skill based on the service issue associated with the service inquiry from the user equipment; and establishing a third interaction between the first virtual agent, the second virtual agent, and the user avatar associated with the user equipment of the user to generate the customized solution to address the service issue in the virtual environment.

\* \* \* \* \*